United States Patent Office 3,386,690
Patented June 4, 1968

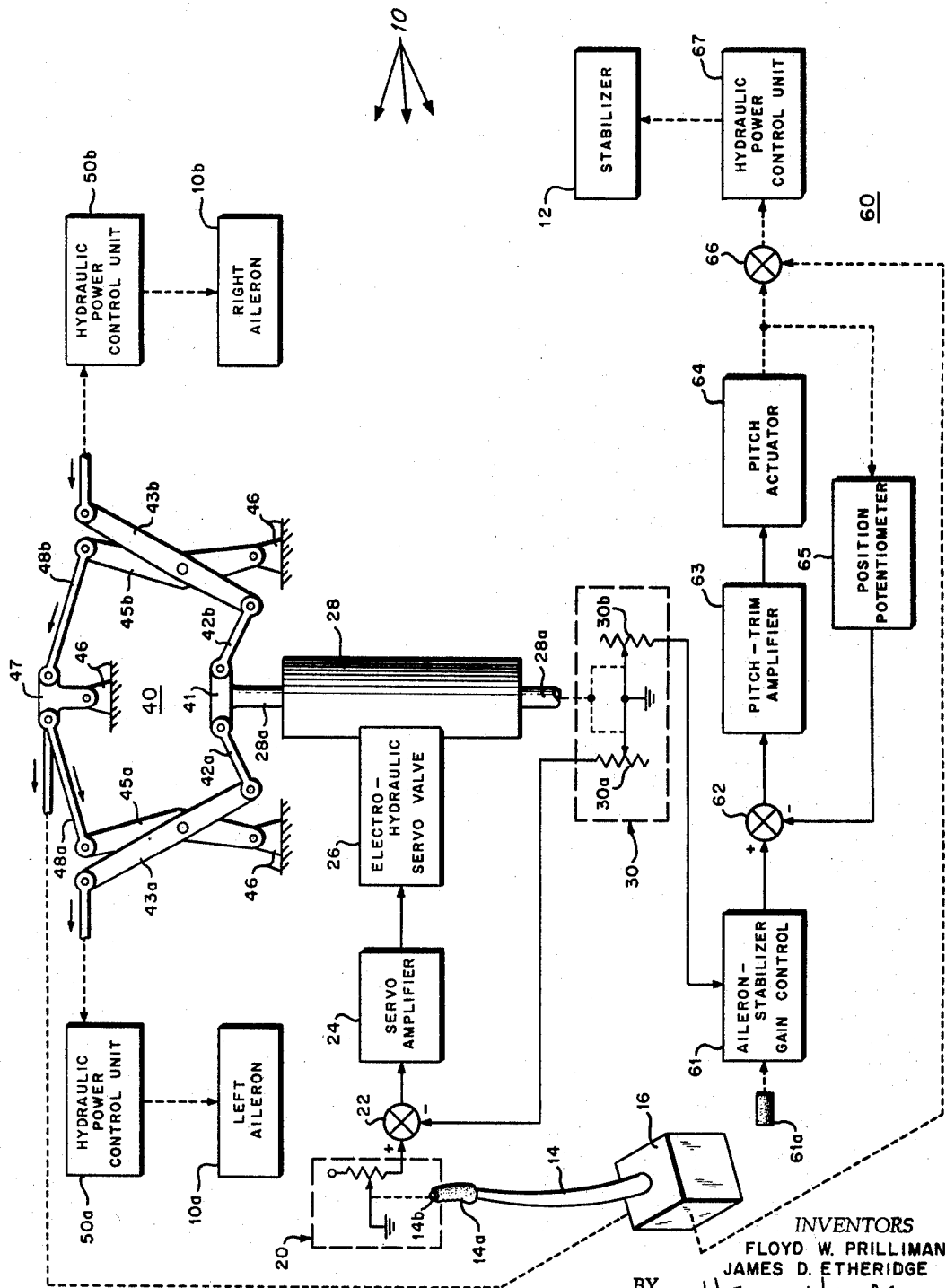

3,386,690
DIRECT LIFT CONTROL SYSTEM
Floyd W. Prillman, Dallas, and James D. Etheridge, Irving, Tex., assignors, by mesne assignments, to the United States of America as represented by the Secretary of the Navy
Filed Feb. 17, 1966, Ser. No. 529,595
3 Claims. (Cl. 244—83)

ABSTRACT OF THE DISCLOSURE

An aircraft direct lift control system for simultaneously causing deflection of right and left ailerons through similar angles in the same direction irregardless of their initial angular positions and simultaneously causing deflection of the leading edge of a horizontal stabilizer through a corresponding selected angle. The system includes a potentiometer-driven hydraulic piston for driving a mechanical, algebraic summing linkage connected between a pilot control stick and power control units which actuate the ailerons. The piston also drives a potentiometer-driven actuator system to correspondingly cause deflection of the horizontal stabilizer.

The present invention relates to a control system and more particularly to a system for controlling the deflection or position of the direct lift and longitudinal control surfaces of a fixed wing aircraft for the primary purpose of regulating the flight path of the aircraft.

Direct lift is the descriptive title given to the concept of directly changing lift of an airfoil by changing its lifting capabilities at a fixed air flow inclination (angle of attack) and fixed airspeed. Direct lift control as used herein means the control of a device producing direct lift for the primary purpose of controlling the airplane's flight path.

The landing approach to a carrier involves precision flying and imposes great demands on the pilot of the descending aircraft. One of the problems of prior systems in maintaining proper altitude during descent was the lag time between a movement of the horizontal tail and the response in lift on the aircraft. A system was proposed which includes the simultaneous use of the right and left ailerons as flaps, whereby the variable position of said ailerons provided variable lift during the landing approach. However, it was found that the use of the aileron alone for lift caused the aircraft to change to a nose-down attitude which approximately canceled the benefit gained from the increased lift at the wing.

In order to eliminate these conditions the present invention couples the horizontal tail or stabilizer with the ailerons or other direct lift controls without interfering with other control linkages so that the leading edge of the horizontal tail moves down slightly in conjunction with the lowering of the ailerons from their neutral position, thereby tending to keep the attitude of the plane constant. A spring-loaded potentiometer which is incorporated in the pilot's control stick provides the electrical signal which is translated through an amplifier to a standard hydraulic actuator system that moves the respective control surfaces.

It is an object of the present invention to provide a control system for a fixed wing aircraft which aids a pilot in staying on a predetermined glide path during a landing approach.

Another object of the present invention is to provide a control system which provides a more rapid means of obtaining a change in altitude than normal longitudinal control.

A still further object of the present invention is to provide a control system for a fixed wing aircraft which improves the pilot's ability to stay on a glide path while making a carrier approach and thereby reducing carrier landing accidents.

A still further object of the present invention is to provide a control system which provides a more rapid means of changing the flight path of the aircraft by eliminating the time lag associated with rotating the aircraft when using normal longitudinal control.

Still another object of the present invention is to provide a control system for varying the aileron droop as a flap to obtain a rapid change in normal acceleration without significantly changing aircraft pitch attitude and which supplements the normal longitudinal control.

Various other objects and advantages will appear from the following description of an embodiment of the invention, and the novel features will be particularly pointed out hereinafter in connection with the appended claims.

In the drawings:

The figure illustrates a schematic representation of the direct lift control system.

In the illustrative embodiment of the invention and with the particular reference to the figure, the direct lift control system, generally designated at 10, is designed for use with a fixed wing aircraft, not shown, the latter embodying lateral and longitudinal control elements, such as, ailerons 10a, 10b, and stabilizer 12, respectively.

The aircraft is provided with a nominal aileron droop of, for example 15° with a preset degree of variable aileron droop for direct lift control, this variable aileron droop being, for example, plus or minus 15°.

In particular, the direct lift control system 10 includes a pilot control stick 14 which, through an appropriate gearing unit generally indicated at 16, controls the deflection or droop of ailerons 10a and 10b, and the deflection of stabilizer 12, as will be discussed below. The grip 14a of the control stick 14 houses a spring-loaded-to-neutral potentiometer 20 which may take the form of a thumb 14b wheel or the like and which provides a direct control command signal for controlling the aileron droop or deflection. It is contemplated that the number of degrees of thumb wheel rotation be proportional to the number of degrees of aileron droop. The sense of thumb motion required to operate the direct lift control system is chosen to produce the same direction of airplane response as with normal pitch trim, i.e., down thumb motion produces a gain in aircraft altitude and vice versa.

The output signal from the potentiometer 20 is supplied to a differential 22 which also receives the output signal from potentiometer 30a to be more fully described below. The output or "error" signal from the differential 22 is amplified by servo amplifier 24 and is supplied to an electro-hydraulic servo valve 26 of the type known and used in the art.

Servo valve 26 operates an actuator 28 which may take the form of a commonly known single channel electro-hydraulic actuator and includes an actuator rod or piston rod 28a. A dual position potentiometer generally indicated at 30 and including potentiometers 30a and 30b are installed on the actuator rod 28a, the position of the latter determining the value of the output signals from the potentiometers 30a and 30b. Potentiometer 30a provides the input signal to differential 22 which is compared with the output signal of potentiometer 20 and provides the amplified "error" signal discussed above.

The output of the actuator 28 operates a scissors type linkage generally indicated at 40 which algebraically sums the lateral or roll input to the aileron obtained from the pilot through the manipulation of the control stick 14 together with the aileron droop commands from the actuator 28. The scissors linkage 40 includes a lever 41 rigidly secured to the actuator shaft 28a and having a pair of links 42a and 42b pivotally connected thereto. A pair of translating crank arms 43a and 43b are pivotally connected at one end thereof to the other end of links 42a and 42b, respectively. A pair of operating rods 44a and 44b are pivoted at one end thereof to the other end of translating crank arms 43a and 43b, respectively, the latter being pivotally connected intermediate the ends thereof to pivoted crank arms 45a and 45b, respectively, intermediate the ends thereof. One end of the pivoted crank arms 45a and 45b, in turn, are pivotally connected to a fixed portion of the aircraft generally indicated at 46. A bell crank 47 is also pivotally connected to a fixed portion of the aircraft structure indicated at 46 and includes a pair of link members 48a and 48b pivotally connected to both the bell crank 47 and the other end of pivoted crank arms 45a and 45b. Operating rods 44a and 44b are connected to the valve assembly of the hydraulic power control units 50a and 50b of the type known and used in the art for providing the appropriate droop to the left and right ailerons 10a and 10b, respectively.

As may be readily observed upward movement of the actuator rod 28a causes the operating rods 44a and 44b to move outwardly of the center of the system 40 to effect simultaneous and uniform deflection of the ailerons 10a and 10b while downward movement of piston rod 28 effects deflection in the opposite direction.

In order to provide the pilot with lateral input to correct for roll or the like the pilot control stick 14 is mechanically coupled to one side of the bell crank 47. As may be observed movement of the control stick 14 which produces movement of the bell crank 47 in the direction shown by the arrow causes the rods 48a and 48b and associated pivoted crank arms 45a and 45b to move toward the left as viewed in the figure. This movement effects a similar leftward movement of translating crank arms 43a and 43b and the associated operating rods 44a and 44b, respectively, which causes the left and right ailerons 10a and 10b to deflect in opposite directions. Therefore, it can be seen that the droop or deflections of the ailerons may be controlled by two separate and distinct operations.

The pitching moment due to the aileron droop discussed immediately above is counterbalanced through the use of a stabilizer-to-aileron-droop-interconnect system generally noted at 60 and now to be described.

The position of actuator rod 28a produces a voltage signal from potentiometer 30b which is supplied to an aileron-stabilizer gain control generally noted at 61. The particular value set within gain control 61 establishes the amount of stabilizer deflection for a given aileron deflection. Although this relationship of deflections may be fixed for a given type of aircraft it is deemed desirable to permit the pilot to adjust the gain or ratio of stabilizer deflection for a given aileron deflection to compensate for various external variables, such as the center of gravity location of the aircraft or the like. This is accomplished by an adjusting knob 61a connected to the gain control 61. For purposes of illustration and not limitation a gain setting of 2.0° will provide a tail or stabilizer deflection of 1.3° for an aileron droop of 4.0°. The pitching moment is compensated for by having the output of potentiometer 30b fed through the gain control 61 to a differential 62 which in turn provides an "error" signal to pitch trim amplifier 63. The amplified signal is then supplied to a pitch actuator 64 which both positions the wiper arm of position potentiometer 65 and drives a differential 66. The output of position potentiometer 65 is fed to differential 62 for comparison with the output of the gain control 61 thereby providing the "error" signal. Differential 66 positions the valve of a hydraulic power control unit 67 which, in turn, causes the deflection of stabilizer 12 in the manner known in the art. In order to provide the pilot with independent operation of the stabilizer 12 the pilot control stick 14 is mechanically coupled to the differential 66 which permits the pilot to increase or decrease the deflection of stabilizer 12 under given flight conditions and to thereby exercise independent selective control of the stabilizer 12.

In review, when the pilot desires to obtain rapid incremental increases and decreases in lift of the aircraft the direct lift control is achieved by varying the aileron droop setting. The commands for changes in lift, through changes in aileron droop, are sent from the thumb wheel potentiometer control 20 located on the pilot stick 14 to the actuator 28 which may be mounted on the fuselage in the wing pivot area. The output of the actuator 28 operates a scissor type linkage 40. This linkage algebraically sums the pilot roll input to the ailerons, together with the aileron droop commands from the actuator 28. The direct lift control system is deactivated by releasing the thumb wheel 20 which is spring pressed to neutral which, in turn, cuts off the pressure flow to the electro-hydraulic servo valve 26. In order to compensate for the pitching moment changes that will occur because of aileron droop variation, compensatory signals are sent to the horizontal tail or stabilizer 12 via the longitudinal pitch trim actuator 64.

It will be understood that various changes in the details, materials, steps and arrangement of parts, which have been herein described and illustrated in order to explain the nature of the invention, may be made by those skilled in the art within the principle and scope of the invention as expressed in the appended claims.

We claim:

1. A control system for a fixed wing aircraft comprising:
   first control means (14, 16) for providing a roll signal and a pitch signal;
   second control means (20, 28) for providing a lift signal;
   linkage means (40) connected to said first and second control means for receiving said roll signal and said lift signal and for proportionally moving the right and left ailerons of the aircraft in opposite directions in response to said roll signal and for proportionally moving the right and left ailerons in same direction in response to said lift signal;
   compensating means (30b, 61a, 64) connected to said second control means for receiving said lift signal and for providing a compensating signal; and
   differential means (66) connected to said compensating means and to said first control means for receiving said pitch and said compensating signals therefrom and having an output signal for actuating movement of the stabilizer of the aircraft.

2. A control system according to claim 1 wherein said compensation means includes:
   modifying means (30b) for providing a compensating signal proportional to said lift signal; and
   adjusting means (61a) for varying the proportional relationship between said compensating signal and said lift signal.

3. In a fixed wing aircraft having right and left ailerons and having a control unit (14, 16) responsive to a roll command signal applied thereto by the pilot for actuating pivotal movement of the ailerons in opposite directions, a control system comprising:
   a bell crank (47) connected to the pilot control unit and pivotally connected to the aircraft for movement about a first fixed point (46) in response to the roll command signal;
   first and second lever arms (45a, 45b) each having one end pivotally connected to the aircraft for pivotal movement about second and third fixed points (46);
   first and second links (48a, 48b) each connected between said bell crank and the other end of a respective one of said first and second lever arms;
   lift control means (20, 28) mounted on the aircraft and having an actuator rod (28a) positioned in accordance with a lift command signal applied thereto by the pilot;

third and fourth lever arms (43a, 43b) each pivotally connected intermediate its ends to the intermediate portion of a respective one of said first and second lever arms, one end of each of said third and fourth lever arms being connected for actuating pivotal movement of a respective one of the right and left ailerons; and third and fourth links (42a, 42b) each being connected between said actuator rod and the other end of a respective one of said third and fourth lever arms for actuating simultaneous and uniform pivotal movement of the right and left ailerons in the same direction in response to movement of said actuator rod.

References Cited

UNITED STATES PATENTS

| | | | |
|---|---|---|---|
| 2,304,487 | 12/1942 | Stinson | 244—83 |
| 2,422,035 | 6/1947 | Noyes | 244—83 |
| 2,478,033 | 8/1949 | Weick | 244—83 |
| 2,885,163 | 5/1959 | De Haven | 244—83 |
| 2,985,408 | 5/1961 | Johnson | 244—90 XR |
| 3,273,831 | 9/1966 | Vernon et al. | 244—83 |
| 2,595,192 | 4/1952 | Garby | 244—87 |
| 2,859,926 | 11/1958 | Westbury | 244—83 |
| 2,912,191 | 11/1959 | Millam. | |

ANDREW H. FARRELL, *Primary Examiner.*